(12) United States Patent
Matsubara et al.

(10) Patent No.: US 8,392,524 B2
(45) Date of Patent: Mar. 5, 2013

(54) INFORMATION PROCESSING APPARATUS, RESOURCE IDENTIFYING PROGRAM, AND RESOURCE IDENTIFYING METHOD

(75) Inventors: Masazumi Matsubara, Kawasaki (JP); Yuji Wada, Kawasaki (JP); Yasuhide Matsumoto, Kawasaki (JP); Yukihiro Watanabe, Kawasaki (JP); Kuniaki Shimada, Kawasaki (JP); Akira Katsuno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 231 days.

(21) Appl. No.: 12/351,559

(22) Filed: Jan. 9, 2009

(65) Prior Publication Data
US 2009/0228477 A1 Sep. 10, 2009

(30) Foreign Application Priority Data
Mar. 10, 2008 (JP) ................................. 2008-059054

(51) Int. Cl.
*G06F 15/16* (2006.01)
(52) U.S. Cl. ........ 709/217; 709/203; 709/216; 709/226; 709/245; 709/246
(58) Field of Classification Search .................. 709/203, 709/216, 217, 226, 245, 246, 219
See application file for complete search history.

(56) References Cited

U.S. PATENT DOCUMENTS

| | | | |
|---|---|---|---|
| 7,308,437 B2 * | 12/2007 | Day et al. ................................. | 1/1 |
| 7,451,185 B2 * | 11/2008 | Morris .......................... | 709/206 |
| 7,756,828 B2 * | 7/2010 | Baron et al. ................... | 707/634 |
| 2003/0046280 A1 | 3/2003 | Rotter et al. | |
| 2003/0182270 A1 | 9/2003 | Kuno et al. | |
| 2003/0236915 A1 | 12/2003 | Okuyama et al. | |
| 2006/0136585 A1 * | 6/2006 | Mayfield et al. ............... | 709/224 |
| 2006/0161466 A1 | 7/2006 | Trinon et al. | |
| 2008/0134198 A1 | 6/2008 | Grasselt et al. | |
| 2008/0282321 A1 * | 11/2008 | Hecht et al. ......................... | 726/1 |
| 2009/0030896 A1 * | 1/2009 | Jensen et al. ....................... | 707/5 |
| 2009/0083940 A1 * | 4/2009 | Albrecht et al. ................. | 16/223 |
| 2009/0228477 A1 * | 9/2009 | Matsubara et al. ................ | 707/5 |
| 2009/0228506 A1 * | 9/2009 | Wada et al. .................... | 707/101 |
| 2009/0228526 A1 * | 9/2009 | Wada et al. .................... | 707/201 |

(Continued)

FOREIGN PATENT DOCUMENTS

| | | |
|---|---|---|
| GB | 2 398 200 A | 8/2004 |
| JP | A 5-53811 | 3/1993 |

(Continued)

OTHER PUBLICATIONS

Japanese Office Action issued in corresponding Japanese App. No. 2008-059054, dated Feb. 14, 2012 (with partial translation).

(Continued)

*Primary Examiner* — Michael Won
(74) *Attorney, Agent, or Firm* — Greer, Burns & Crain, Ltd.

(57) ABSTRACT

An information processing apparatus includes: an acquiring unit which acquires a related resource having a predetermined relation to an unfixed resource which is unfixed from among a plurality of fixed resources; and an identifying unit which searches the plurality of fixed resources for the acquired related resource and a resource different from the related resource having the predetermined relation as resources to identify the resources to be identified and the unfixed resource.

9 Claims, 10 Drawing Sheets

U.S. PATENT DOCUMENTS

| | | | |
|---|---|---|---|
| 2010/0070458 A1* | 3/2010 | Otsuka et al. | 706/59 |
| 2010/0185658 A1* | 7/2010 | Kowalski | 707/769 |
| 2010/0250677 A1* | 9/2010 | Kahan et al. | 709/204 |
| 2010/0332544 A1* | 12/2010 | Collins et al. | 707/791 |
| 2011/0004675 A1* | 1/2011 | Wada et al. | 709/220 |
| 2011/0016092 A1* | 1/2011 | Matsubara et al. | 707/654 |
| 2011/0035512 A1* | 2/2011 | Morimoto et al. | 710/8 |
| 2011/0047125 A1* | 2/2011 | Matsumoto et al. | 707/609 |

FOREIGN PATENT DOCUMENTS

| | | |
|---|---|---|
| JP | 11-025142 | 1/1999 |
| JP | A 2000-122910 | 4/2000 |
| JP | 2004-21880 | 1/2004 |
| JP | 2006-195535 | 7/2006 |
| WO | WO 2006/122918 A1 | 11/2006 |

OTHER PUBLICATIONS

UK Examination Report issued in GB0823678.8, dated Apr. 11, 2011.

* cited by examiner

INFORMATION PROCESSING APPARATUS, RESOURCE IDENTIFYING PROGRAM, AND RESOURCE IDENTIFYING METHOD

CROSS-REFERENCE TO RELATED APPLICATIONS

This application is based upon and claims the benefit of priority of Japanese Patent Application No. 2008-059054, filed on Mar. 10, 2008, the entire contents of which are incorporated herein by reference.

FIELD

The present invention relates to an FCMDB which manages information of a resource constituting a system.

BACKGROUND

A database called an FCMDB (FCMDB: Federated Configuration Management Database) is known. This database is a database which virtually unifies databases of a plurality of types which manage information related to hardware and software constituting an information system to manage information of a resource constituting the system.

Figure 1:
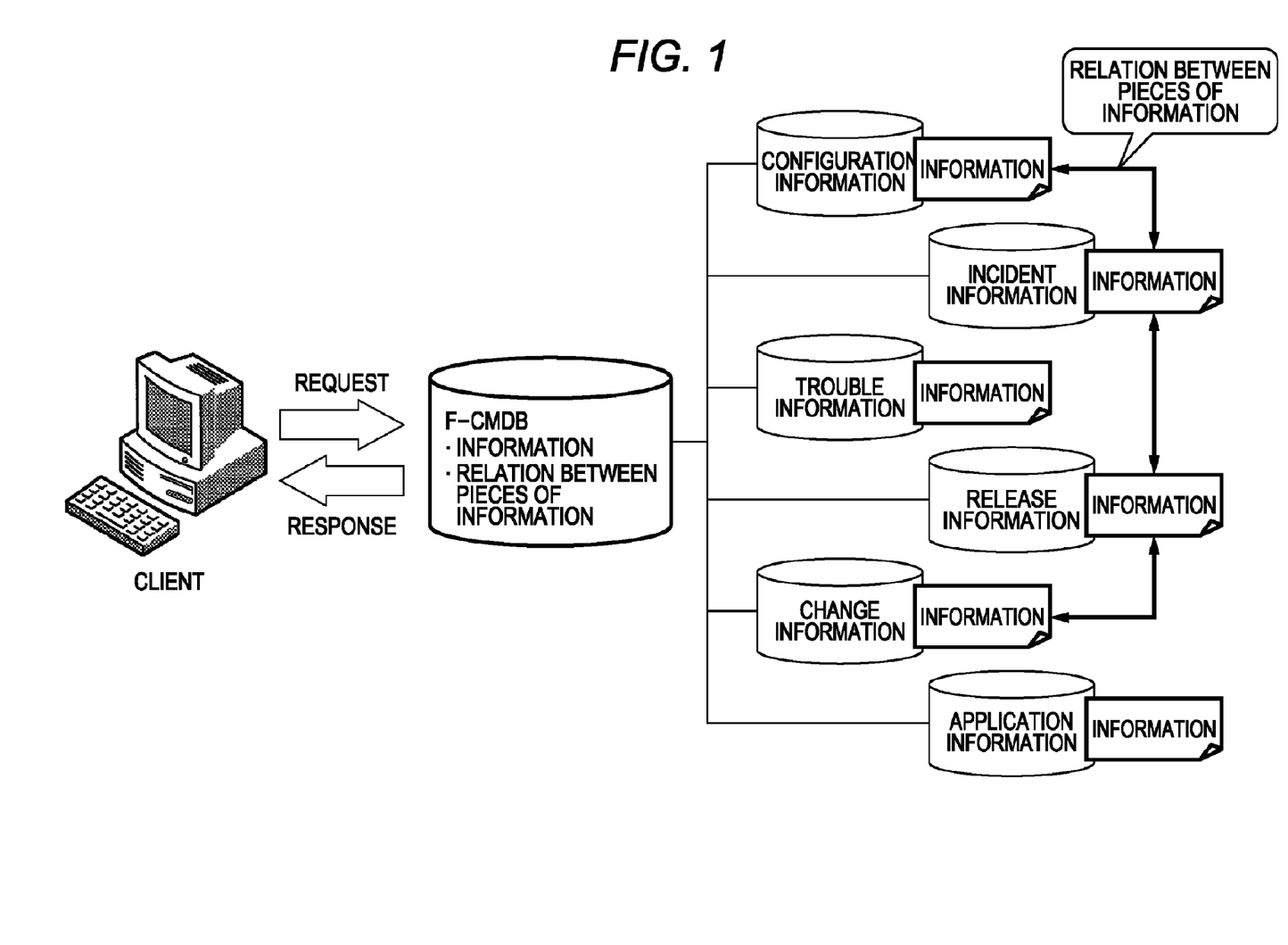
FIG. 1 is a diagram for explaining a conventional function overview related to an FCMDB.

As shown in FIG. 1, the FCMDB is a virtually unified DB which makes it possible to cross-sectionally operate a plurality of databases, for example, a constituent information DB, an incident information DB, a trouble information DB, a release information DB, a change information DB, and an application information DB. Each of the plurality of unified databases manages a CI (Configuration Item) serving as attribute information related to a device (resource) constituting the system and a relationship between the pieces of information.

Figure 2:
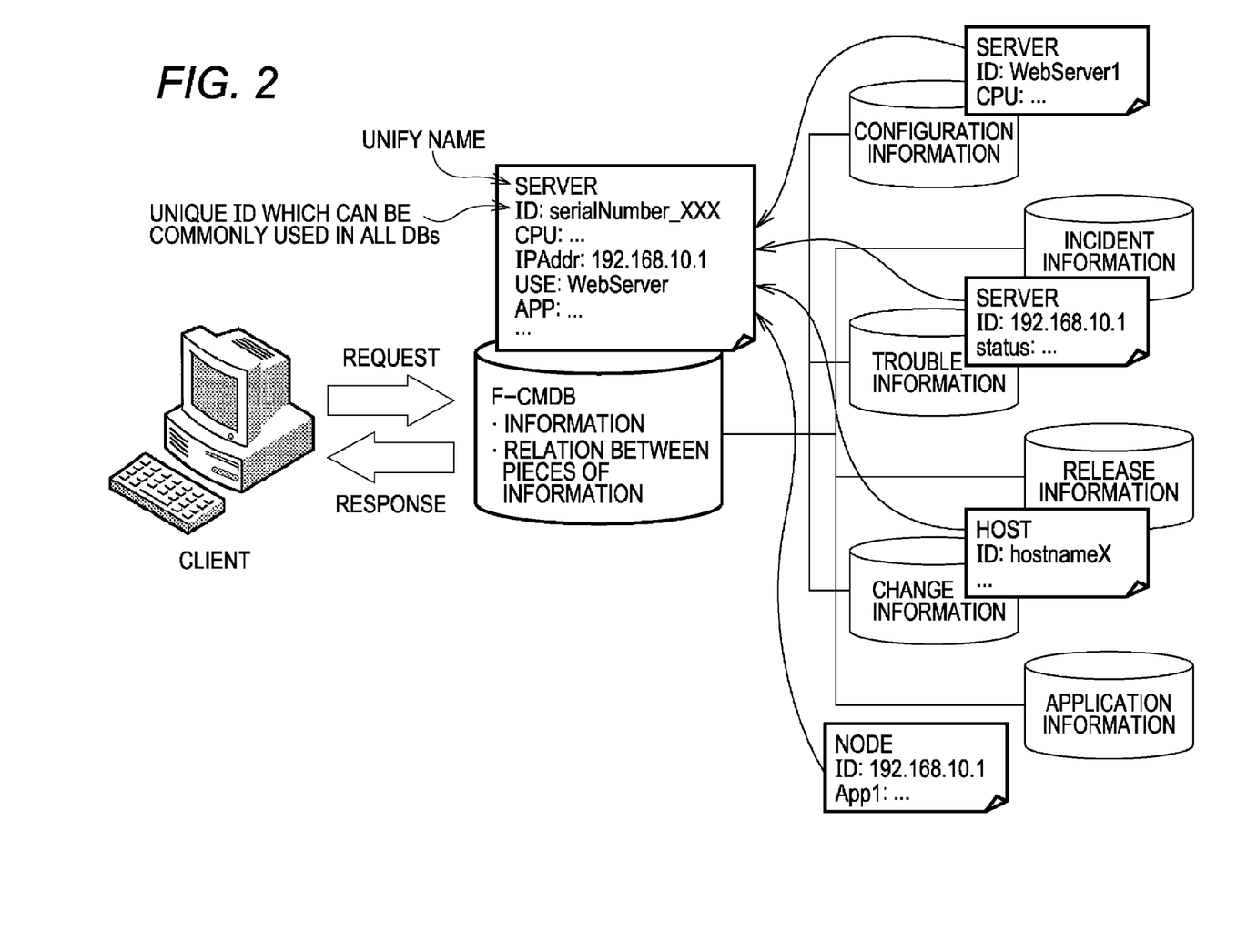
FIG. 2 is a diagram for explaining a conventional reconciliation function related to the FCMDB.

The FCMDB has a reconciliation function. This, as shown in FIG. 2, is to reconcile information by managing information of the same item managed by different names and different local IDs in units of databases by a unique ID (to be referred to as a global ID hereinafter) which can be commonly used in all the databases to reconcile the information.

Figure 3:
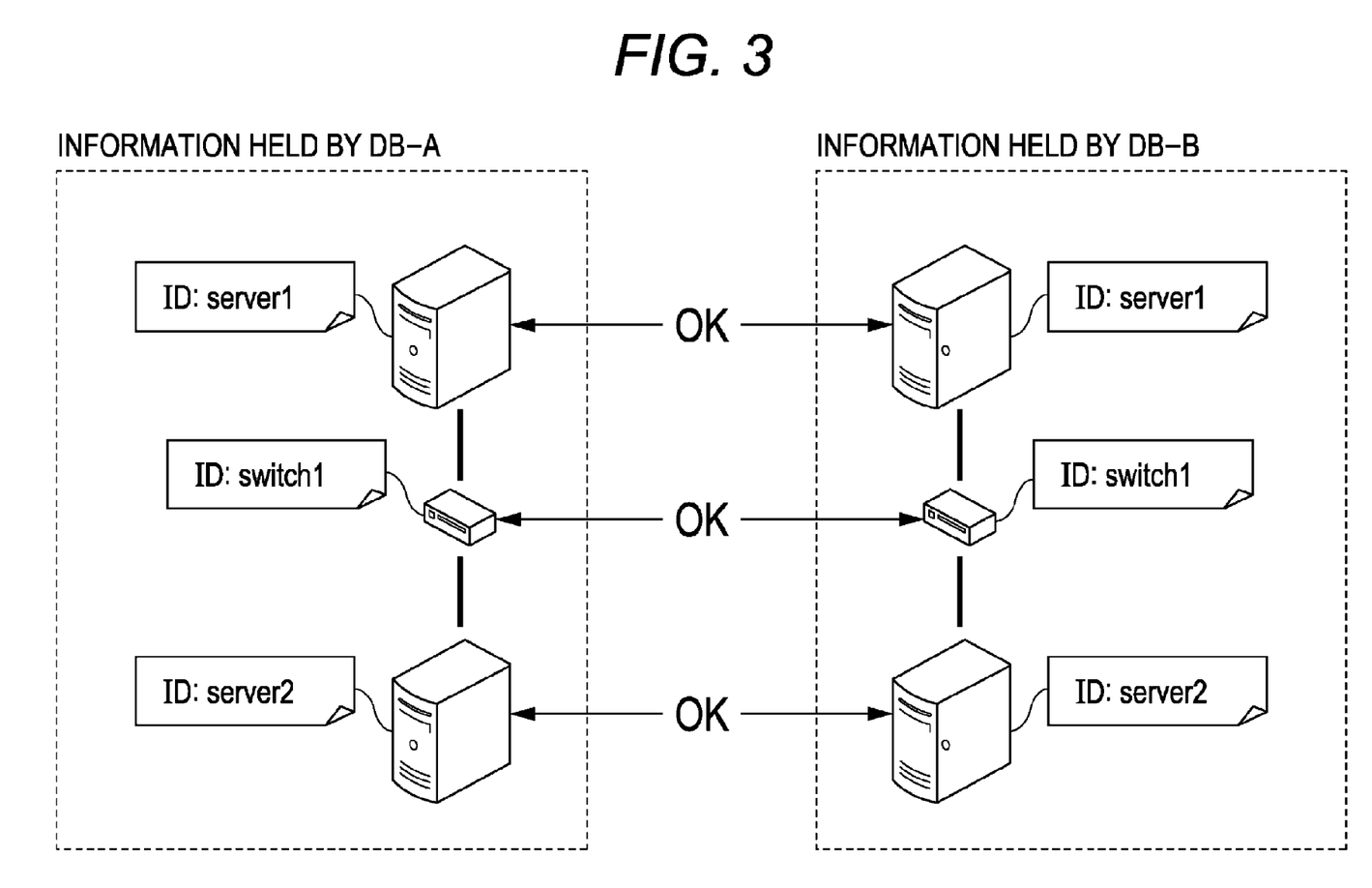
FIG. 3 is a diagram for explaining an identifying function of a conventional resource related to the FCMDB.

In order to realize the reconciliation, pieces of information which are uniquely held and managed by each of the databases are associated with each other. In this association, as shown in FIG. 3, a global ID is given to each resource in advance, and the global IDs are matched with each other to identify the resource.

Figure 4:
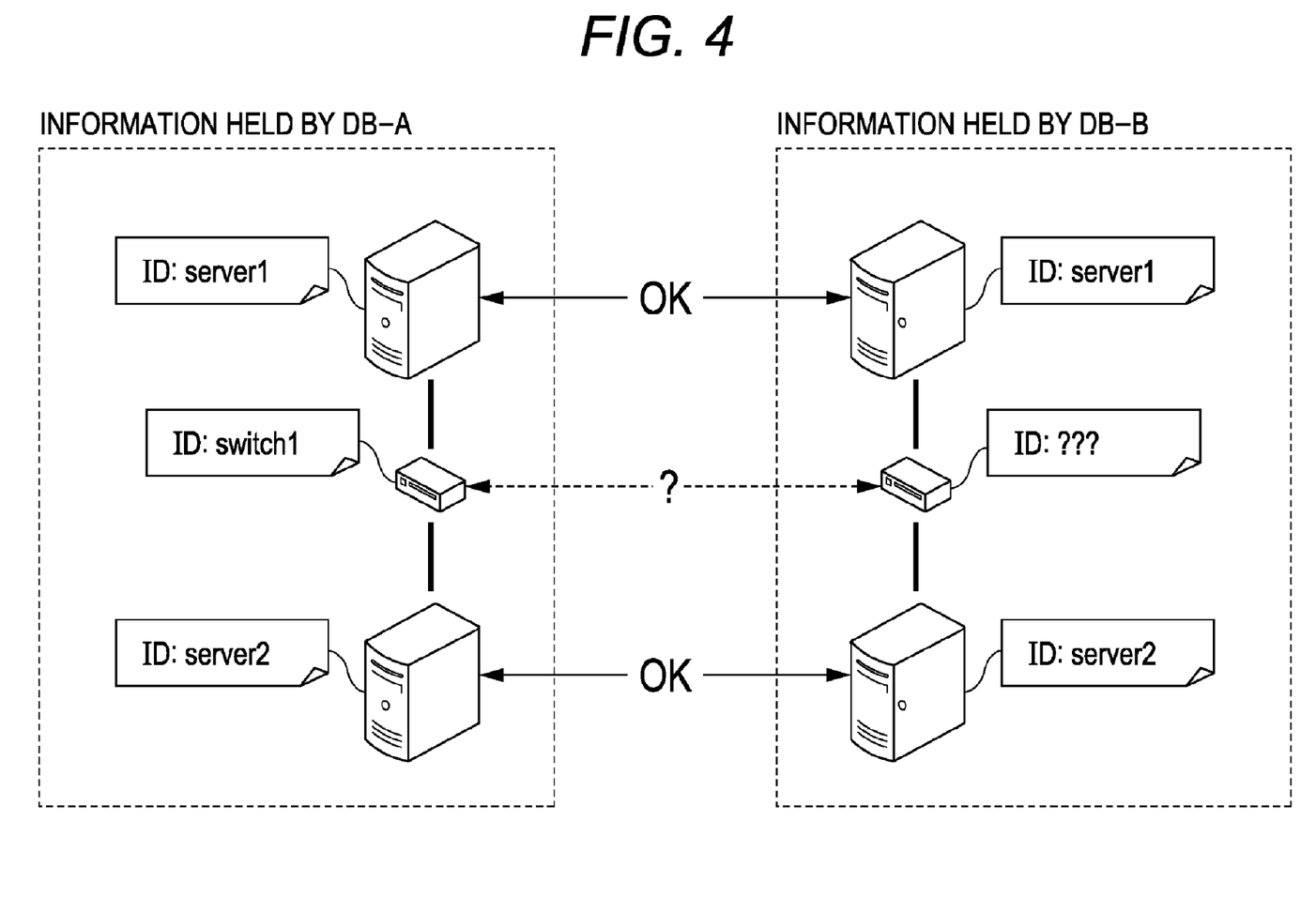
FIG. 4 is a diagram showing a problem of the conventional resource identifying function related to the FCMDB.

However, there are various pieces of operation management software, and not all databases always hold global IDs. As shown in FIG. 4, switch1 serving as an ID is included in a DB-A which is a database but is not included in a DB-B which is another database, and the mapping cannot be performed. In order to unify databases without contradiction or overlapping, it is required to make it possible to also identify an ID-deficit resource.

SUMMARY

According to an aspect of an embodiment, an information processing apparatus includes: an acquiring unit which acquires a related resource having a predetermined relation to an unfixed resource serving as a resource which is unfixed from a plurality of fixed resources; and an identifying unit which searches the plurality of fixed resources for the acquired related resource and a resource different from the related resource having the predetermined relation as resources to be identified, to identify the resources to be identified and the unfixed resource.

DETAILED DESCRIPTION OF THE PREFERRED EMBODIMENT

Figure 5:
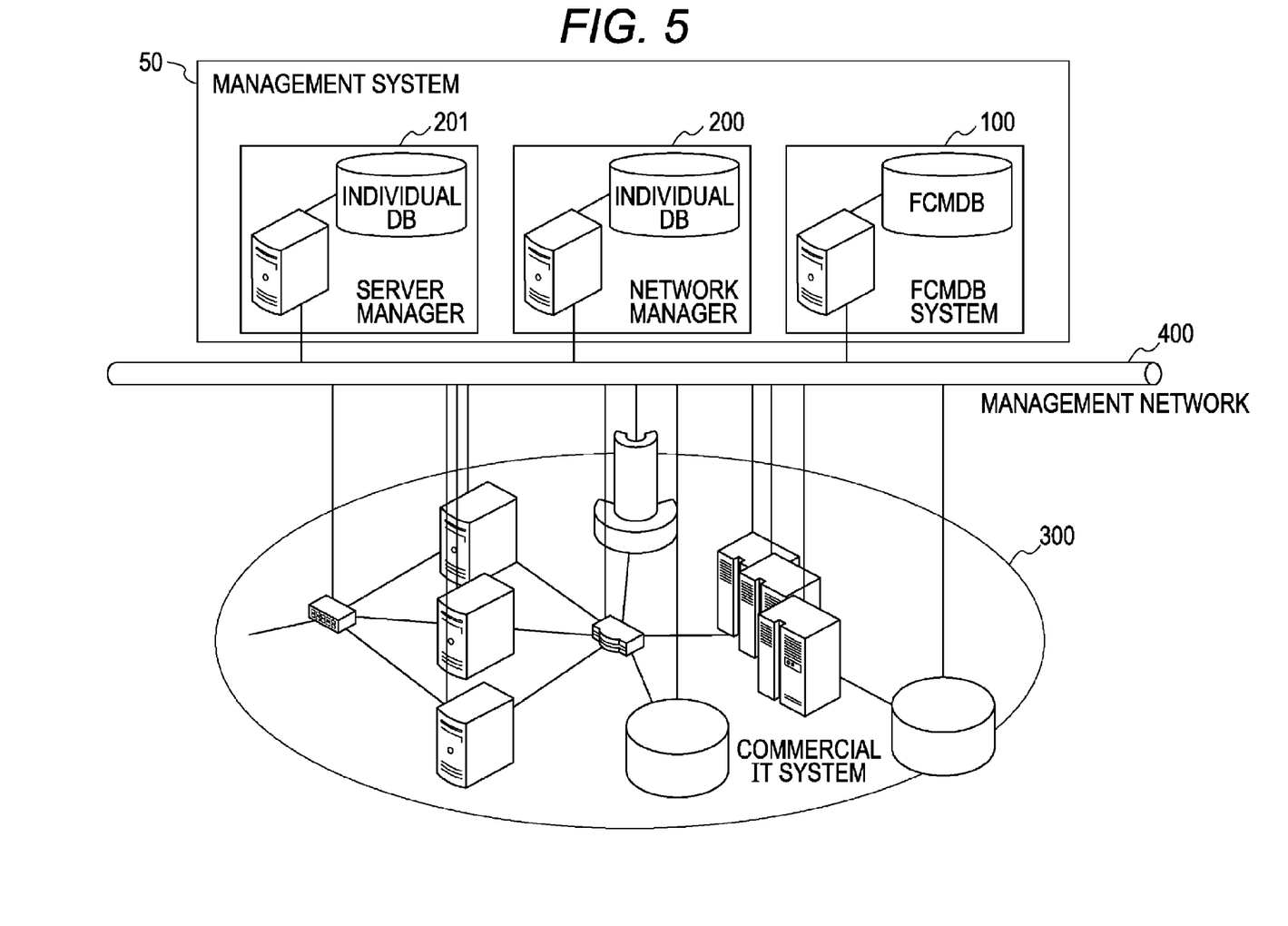
FIG. 5 is a diagram showing an example of a configuration of an IT system according to an embodiment.

An embodiment of the present invention will be described below with reference to the accompanying drawings. FIG. 5 shows an entire network configuration of an IT system in the embodiment.

In the embodiment, a commercial IT system 300 to execute business processing of a user and a management system 50 which manages a network device and a server which constitute the commercial IT system 300 are connected to each other through a management network 400.

The management system 50 includes a server manager 201 which performs management related to the server of the commercial IT system 300, a network manager 200 which manages the network device, and an FCMDB system 100 (information processing apparatus).

The server manager 201 and the network manager 200 have individual DBs (DB: DataBase), respectively. Each DB holds resources such as network devices, servers and the like (to be referred to as a device hereinafter when a network device and a server are generally named) connected to a network and pieces of attribute information (for example, a server name, an IP address, and a product name) (definition information) to define the resources in the individual DB to manage the network device and the server.

Figure 6:
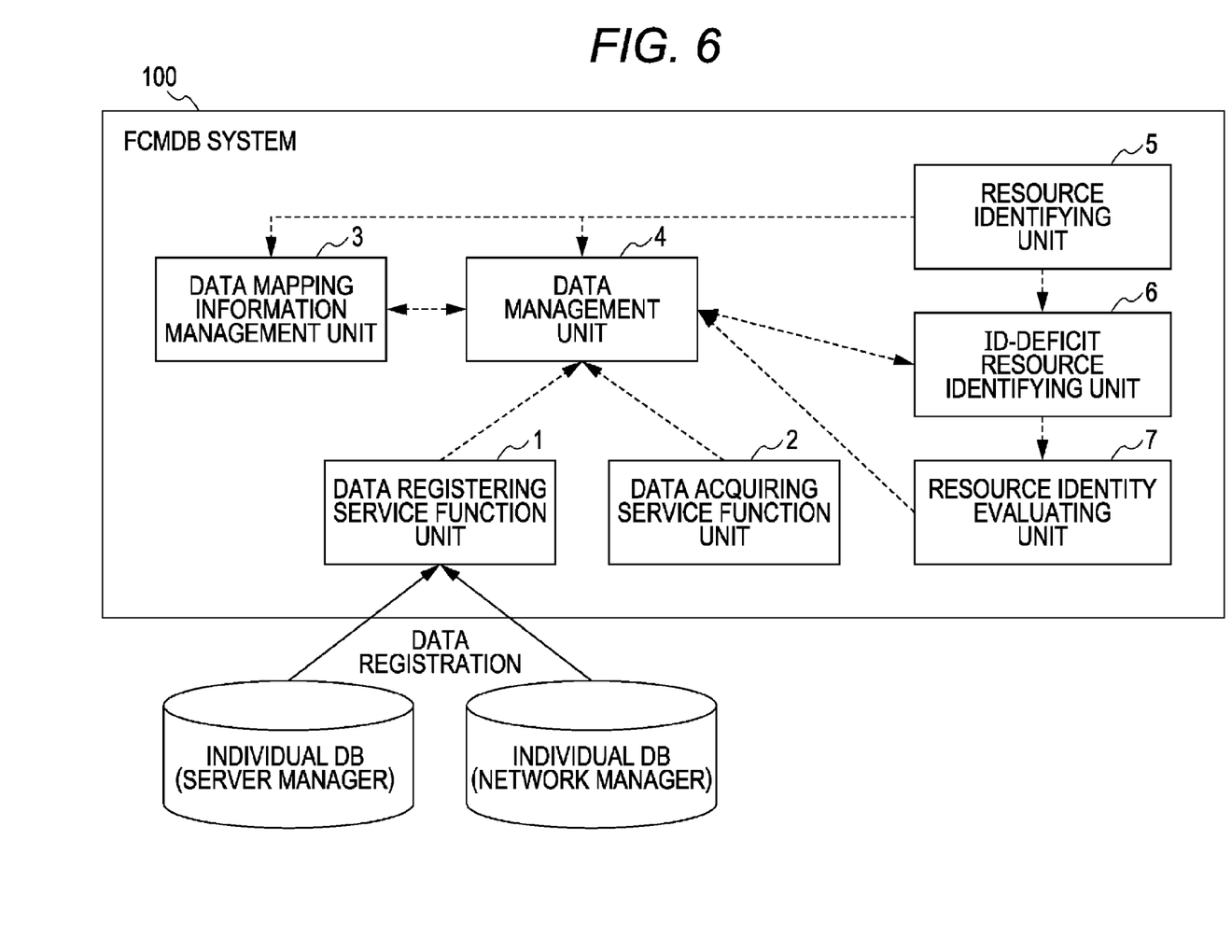
FIG. 6 is a diagram showing an example of a configuration of an FCMDB system according to the embodiment.

Functions constituting the FCMDB system 100 in the embodiment will be described below with reference to function blocks in FIG. 6. The FCMDB system 100 includes a data registering service function unit 1, a data acquiring service function unit 2, a data mapping information managing unit 3, a data managing unit 4, a resource identifying unit 5, an ID-deficit resource identifying unit 6, and a resource identity evaluating unit 7. These functions are realized by cooperating hardware resources such as a CPU, a memory, and a hard disk (not shown) included in the FCMDB system 100 and software. The FCMDB system 100 has an FCMDB in the hard disk.

The data registering service function unit 1 accepts data registration from an MDR (Management Data Repository). The data acquiring service function unit 2 accepts a query from a client (not shown) and returns a searching result of the FCMDB to the client. The data mapping information managing unit 3 manages a relationship between a data format unique to each MDR and an FCMDB common data format.

The data managing unit 4 manages the contents of data held in the MDRs and a relation (related information) of the data. The data managing unit 4 acquires a resource (related resource) having a predetermined relation to a resource with a deficiency of an ID (to be referred to as an ID-deficit resource) (unfixed resource) from an individual DB or an FCMDB (in these IDs, a plurality of resources (to be referred to as fixed resources) having fixed IDs are held). Furthermore, the data managing unit 4 merges attribute information of an identified ID-deficit resource and a resource regarded as an ID-deficit resource.

The resource identifying unit 5 determines, on the basis of whether an ID has been set in a resource to be registered, whether the resource to be registered is the same as the resource registered in advance.

The ID-deficit resource identifying unit 6 searches fixed resources held in the individual DB or the FCMDB for a resource to be identified with respect to an ID-deficit resource. More specifically, the ID-deficit resource identifying unit 6, on the basis of a resource (related resource) acquired by the data managing unit 4 and a relation used when the related resource is acquired in the data managing unit 4, searches the FCMDB for a resource (to be referred to as a resource to be identified) which can be identified as the same resource as the ID-deficit resource. The ID-deficit resource identifying unit 6 identifies the ID-deficit resource and the resource to be identified.

The resource identity evaluating unit 7 evaluates the probability of identity between the resource to be identified for which the ID-deficit resource identifying unit 6 searches and the ID-deficit resource.

The FCMDB in the FCMDB system 100 in the embodiment holds pieces of attribute information of resources managed by individual DBs and related information representing aspects of relations between the resources.

The pieces of related information include the following.

Physical network connection information; a connection relation between devices (relation between a predetermined device and a specific one of devices through a network)

Application install information; relation representing a specific application installed in each server More specifically, two or more resources are connected to each other by these pieces of related information. An overview of a method of identifying the FCMDB system 100 will be further described with reference to FIG. 7.

Figure 7:
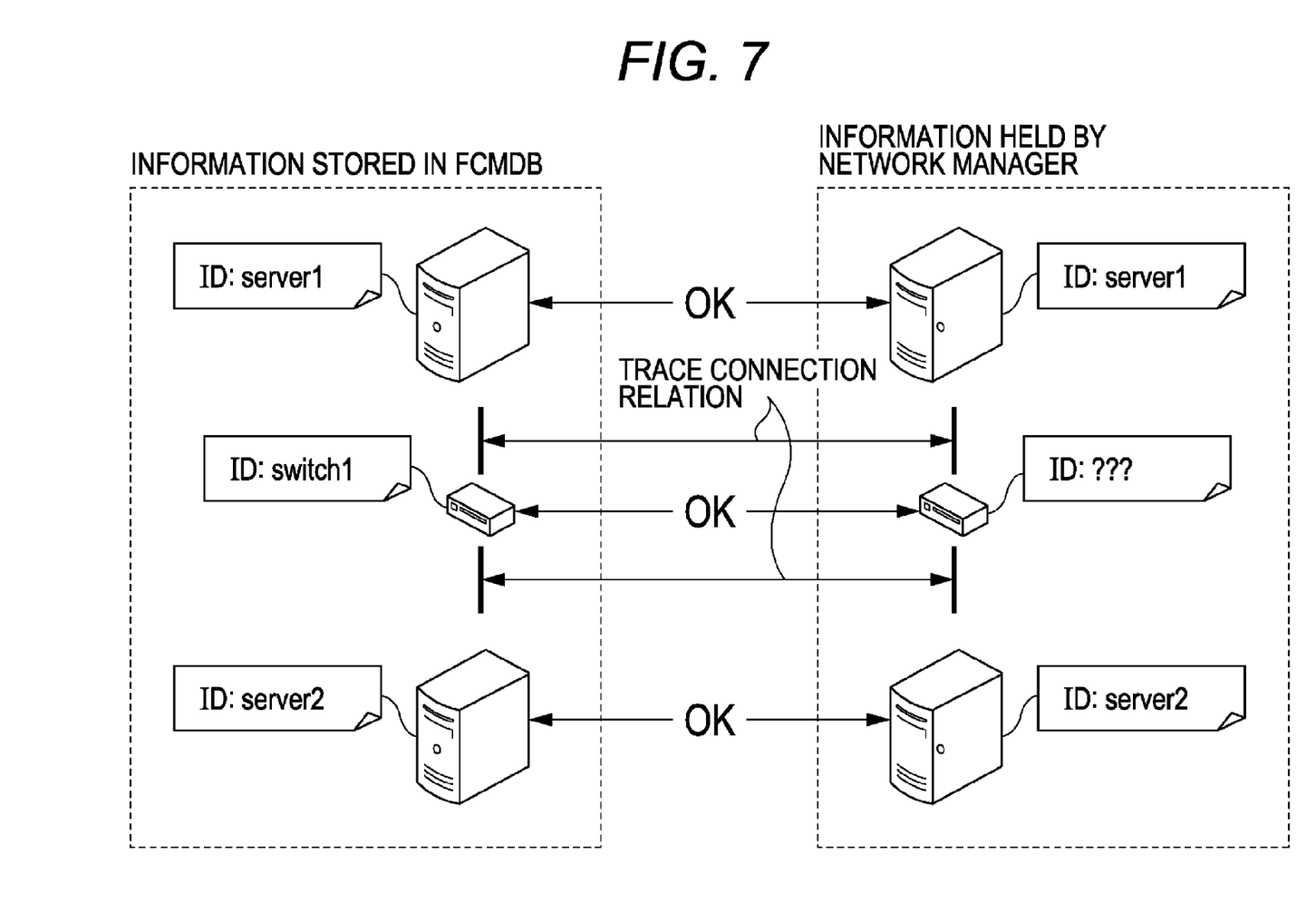
FIG. 7 is a diagram showing an example of an overview of an identifying function of the FCMDB system according to the embodiment.

The FCMDB system 100, on the basis of the related information, clarifies a relation between an ID-deficit resource and another fixed resource. Thereafter, relations of both the objects to be compared with each other are matched with each other, and the objects are regarded as the same resources.

For example, it is assumed that pieces of information of devices having server1, switch1, and server2 as IDs are stored in an FCMDB. In this case, it is assumed that an ID-deficit resource is newly registered in an individual DB of the network manager 200.

For example, in the following case, the FCMDB system 100 regards (identifies) the newly registered resource (ID-deficit resource) as switch1.

There is related information representing that "switch1 is connected to server1 and server 2 through a network".

A connection relation representing "an ID-deficit resource is connected to server1 and server 2" is established.

Figure 8:
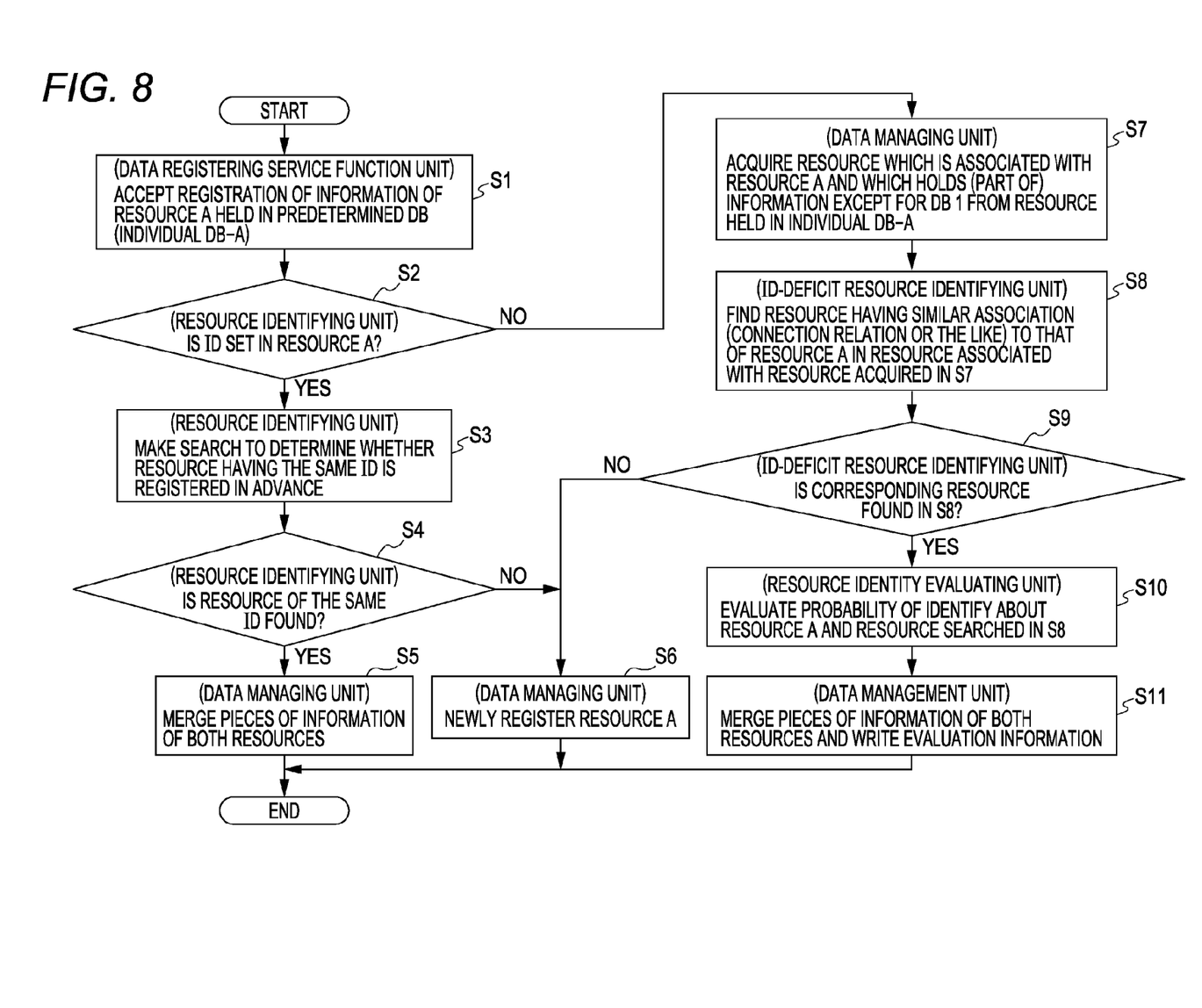
FIG. 8 is a flow chart showing an example of a process of the FCMDB system according to the embodiment.

Processes of the FCMDB system 100 will be described below with reference to the flow chart in FIG. 8. FIG. 8 shows function blocks which execute steps in parentheses.

The data registering service function unit 1 accepts registration of information of a predetermined resource (to be referred to as a resource A hereinafter) held in a predetermined DB. For example, individual DB is included in the network manager 200. The database is to be referred to as an individual DB-A hereinafter (step S1).

The resource identifying unit 5 determines whether an ID is set in the resource A (step S2). In this case, when the ID is set (YES in step S2), the resource identifying unit 5 searches whether a resource having the same ID is registered in the FCMDB in advance (step S3). In this case, when a resource having the same ID is preset in the FCMDB (YES in step S4), the data managing unit 4 merges attribute information of the resource A and attribute information of a resource having the same ID as that of the resource A (step S5) to end the process.

On the other hand, when the resource having the same ID is not present in the FCMDB as a result of searching by the resource identifying unit 5 (NO in step S4), the data managing unit 4 registers the resource A as a new resource (step S6).

Returning to step S2, when no ID is set in the resource A (NO in step S2), a resource (related resource) associated with the resource A and holding (a part of) attribute information except for an individual DB-A is held in the individual DB-A (step S7). More specifically, in step S7, a resource having a predetermined relation to the resource A from a DB having a fixed resource is identified.

Thereafter, the ID-deficit resource identifying unit 6 searches resources associated with the resource acquired in step S7 for a resource having the same relation as that of the resource A (step S8). In this case, when the corresponding resource is preset in step S8 (YES in step S9), the ID-deficit resource identifying unit 6 identifies the resource A and the searched resource (resource to be identified), and the resource identity evaluating unit 7 evaluates the probability of identity with respect to the resource A and the searched resource (step S10).

In this case, when the probability of identity is high, the data managing unit 4 merges the pieces of attribute information of both the resources (the resource A and the searched resource) and writes evaluation information in the FCMDB (step S11).

When the corresponding resource is not present as a result of the searching in step S8 (NO in step S9), the data managing unit 4 newly registers the resource A (step S6).

Figure 9:
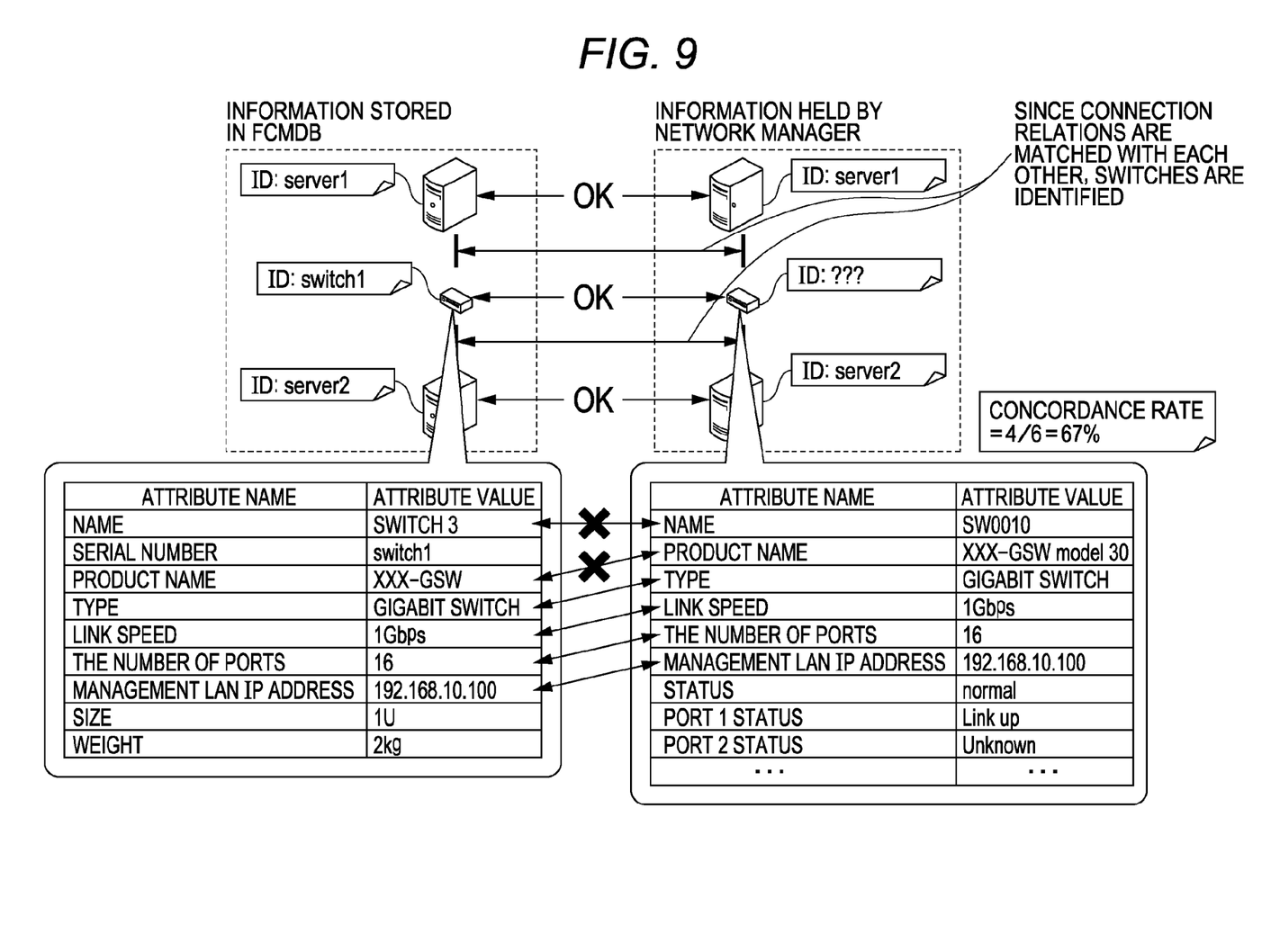
FIG. 9 is a diagram showing an example of an identity evaluating method of the FCMDB system according to the embodiment.

Evaluation of probability of identity in the step S10 will be described below with reference to FIG. 9.

When ID-deficit resource identifying unit 6 identifies a network device having, for example, switch1 as an ID and an unfixed resource (the above resource A) as the same devices on a network configuration, the resource identity evaluating unit 7 compares pieces of attribute information of the identified resources with each other. A comparing method is as follows, for example.

A rate (concordance rate) of matching between the attribute information of switch1 and the attribute information of an unfixed resource is calculated. The concordance rate is calculated as a rate calculated such that the number of items included in both the attribute information of switch1 stored in, for example, an FCMDB and attribute information of an unfixed resource stored in an individual DB (FIG. 9, the individual DB of the network manager 200) is set as a denominator, and the number of items having the matched items in all the items is set as a numerator.

When the concordance rate exceeds a predetermined threshold value (for example, 60%), the resources are evaluated as the same resources, and pieces of attribute information of both the resources are merged by the data managing unit 4. When the concordance rate does not exceed the threshold value, the resources are evaluated as different resources, and the pieces of attribute information are not merged.

In a comparing method by the resource identity evaluating unit 7, the probability that product unique data (for example, a serial number, device dimensions, a size, and a weight of a product) of the devices may not be held in a DB except for the individual DB is high. Therefore, when a flag representing whether an item is added as a comparison item is given to each of the pieces of attribute information to indicate that the product unique data should not be considered as the comparison item, a calculation accuracy of the concordance rate increases.

Figure 10:
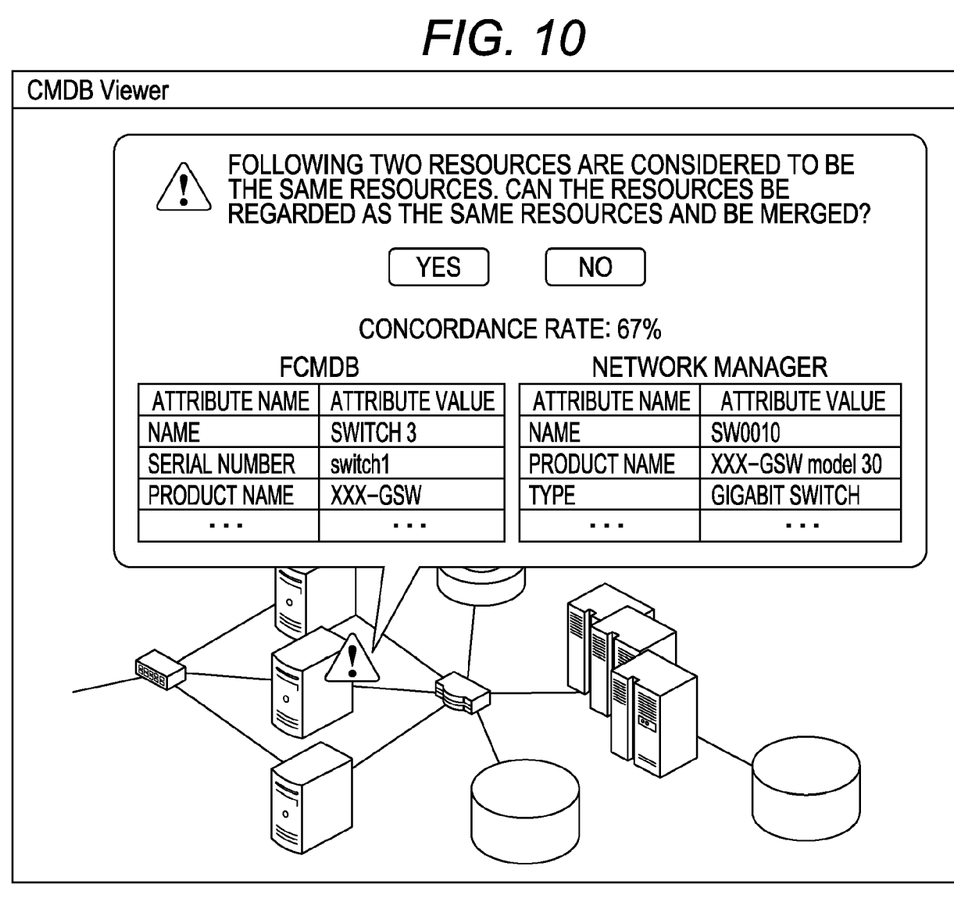
FIG. 10 is a diagram showing a notification example of an evaluation result (concordance rate) of identity of the FCMDB system according to the embodiment.

As shown in FIG. 10, the resource identity evaluating unit 7 may notify a user of a concordance rate calculated without setting a threshold value, and command the user to merge the pieces of attribute information of both the resources.

In the embodiment, a resource is described as a device connected to a network, and a connection relation of each device to a network is mainly described as a predetermined relation. However, the resource can also be applied as a server, and a predetermined relation can also be applied as a relation between a server and an application installed in the server.

In the embodiment, although a server or a network device is used as a resource, a target of the resource is not limited. For example, information about a material to construct an architectural building may be defined as a resource, and a joint relation (representing a specific material to which the corresponding material is joined) may be defined as a predetermined relation. As described above, as the embodiment, any embodiment which can define a resource and a relation to the resource can be applied.

The FCMDB system 100 in the embodiment traces pieces of related information of fixed resources, and regards unfixed resources having the same relations as those of the fixed resources as fixed resources, so that even ID-deficit resources can also be associated.

Although an ID-deficit resource cannot be automatically identified in a conventional art, the FCMDB system 100 according to the embodiment makes it possible to automatically identify the ID-deficit resource. Since an ID-deficit resource which must be manually associated in the conventional art can be automatically associated by the FCMDB system 100, a resource can be more efficiently unified to a large-scale database.

An acquiring unit corresponds to the data managing unit 4 according to the embodiment, and an identifying unit corresponds to the resource identity evaluating unit 7 according to the embodiment. Furthermore, a first merging unit and a second merging unit are configured by functions corresponding to the data managing unit 4 and the resource identity evaluating unit 7 in the embodiment, respectively.

Furthermore, a program which executes the above steps in a computer constituting an information processing apparatus can also be provided as a resource identifying program. The program may be stored in a computer readable recording medium to make the computer constituting the information processing apparatus execute the program. In this case, the computer readable recording medium may include an internal storage device such as a ROM or a RAM which internally mounted in a computer, a portable recording medium such as a CD-ROM, a flexible disk, a DVD disk, a magneto-optical disk, or an IC card.

The invention claimed is:

1. An information processing apparatus comprising:
a processor to execute a process including:
acquiring from multiple already-identified resources at least one related resource linked in a prescribed manner to an unidentified resource;
retrieving the aforementioned related resources,
retrieving another resource from within the multiple already-identified resources as an identified target resource linked in the prescribed manner to the undefined resource,
identifying the identified target resource with the unidentified resource; and
calculating a concordance rate representing a rate of matching between at least one piece of defining information which defines the identified target resource and at least one piece of defining information which defines the unidentified resource.

2. The information processing apparatus of claim 1, the process further including:
when the calculated concordance rate exceeds a predetermined threshold value, merging the defining information of the identified target resource and the defining information of the unidentified resource.

3. The information processing apparatus of claim 2, the process further including:
displaying the calculated concordance rate,
selecting whether the defining information of the identified target resource and the defining information of the unidentified resource are to be merged, and
if a merge is allowed, merging the defining information of identified target resource and the defining information of the unidentified resource.

4. A non-transitory recording medium on which a resource identifying program which is executed by a computer is recorded, the resource identifying program causing a computer to perform a process comprising:
acquiring from multiple already-identified resources at least one related resource linked in a prescribed manner to an unidentified resource;
retrieving the aforementioned related resources, retrieving another resource from within the multiple already-identified resources as an identified target resource linked in the prescribed manner to the unidentified resource, and identifying the identified target resource with the unidentified resource; and
calculating a concordance rate representing a rate of matching between at least one piece of defining information which defines the identified target resource and at least one piece of defining information which defines the unidentified resource.

5. The non-transitory recording medium on which a resource identifying program is recorded, according to claim 4, further comprising:
when the calculated concordance rate exceeds a predetermined threshold value, merging the defining information of the identified target resource and the defining information of the unidentified resource.

6. The non-transitory recording medium on which a resource identifying program is recorded, according to claim 4, further comprising:
  displaying the calculated concordance rate, selecting whether or not the defining information of the resource to be identified and the defining information of the unfixed resource are to be merged, and if a merge is allowed, merging the defining information of identified target resource and the defining information of the unidentified resource.

7. A resource identifying method comprising:
  acquiring from multiple already-identified resources at least one related resource linked in a prescribed manner to an unidentified resource;
  retrieving the aforementioned related resources, retrieving another resource from within the multiple already-identified resources as an identified target resource linked in the prescribed manner to the unidentified resource, and identifying the identified target resource with the unidentified resource; and
  calculating a concordance rate representing a rate of matching between at least one piece of defining information which defines the identified target resource and at least one piece of defining information which defines the unidentified resource.

8. A resource identifying method according to claim 7, further comprising:
  when the calculated concordance rate exceeds a predetermined threshold value, merging the defining information of the identified target resource and the defining information of the unidentified resource.

9. A resource identifying method according to claim 7, further comprising:
  displaying the calculated concordance rate, selecting whether or not the defining information of the identified target resource and the defining information of the unidentified resource are to be merged, and if a merge is allowed, merging the defining information of identified target resource and the defining information of the unidentified resource.

* * * * *